Sept. 20, 1938.    S. R. CUMMINGS    2,130,484
SUCTION CLEANER
Filed March 14, 1935    2 Sheets-Sheet 1
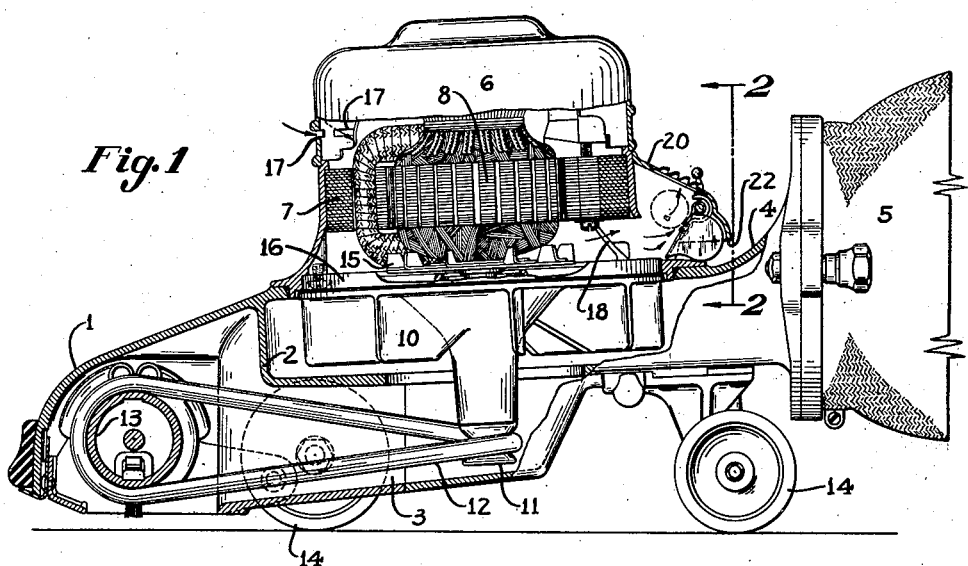
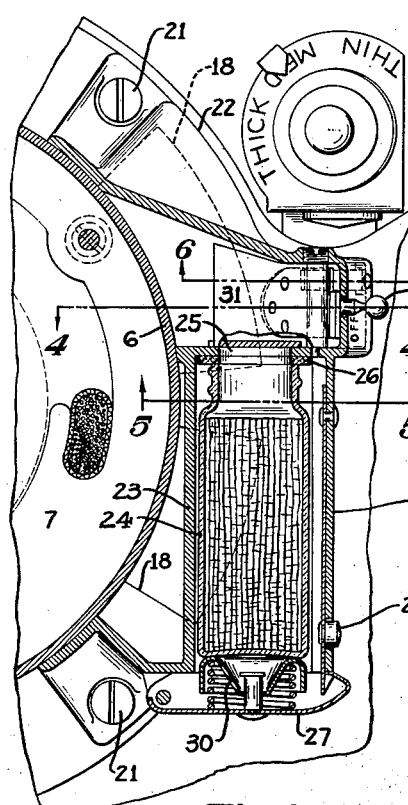
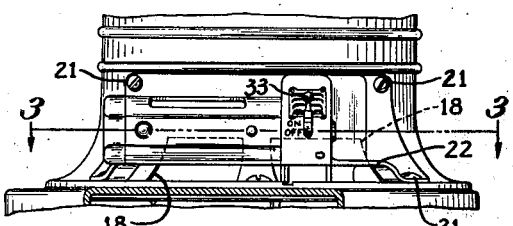
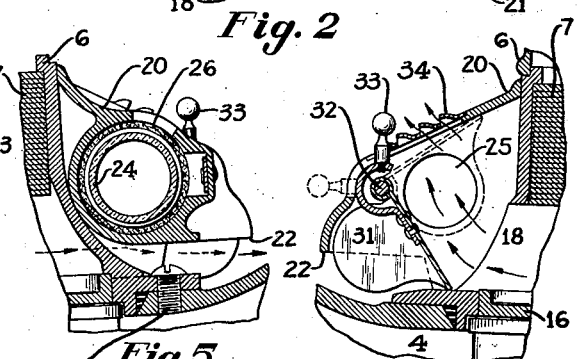
INVENTOR
Stanley R. Cummings
BY Harry S. Dumarse
ATTORNEY Sept. 20, 1938.  S. R. CUMMINGS  2,130,484
SUCTION CLEANER
Filed March 14, 1935  2 Sheets-Sheet 2
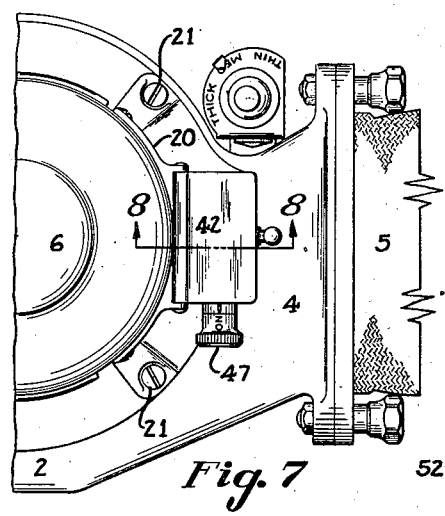
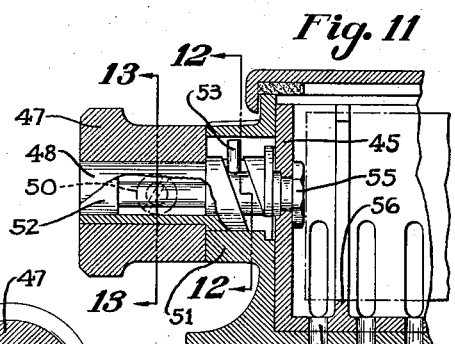
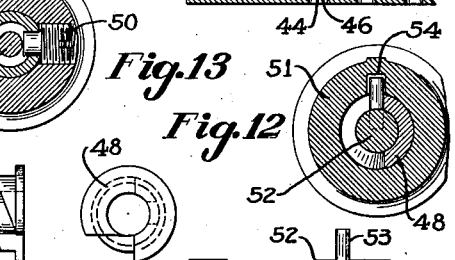
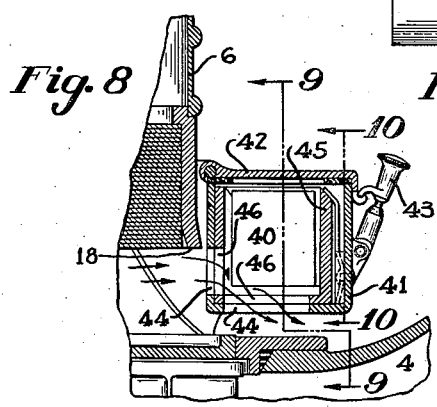
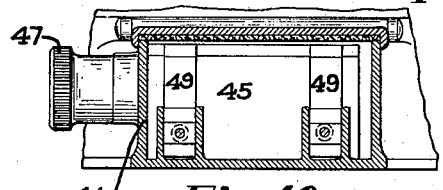
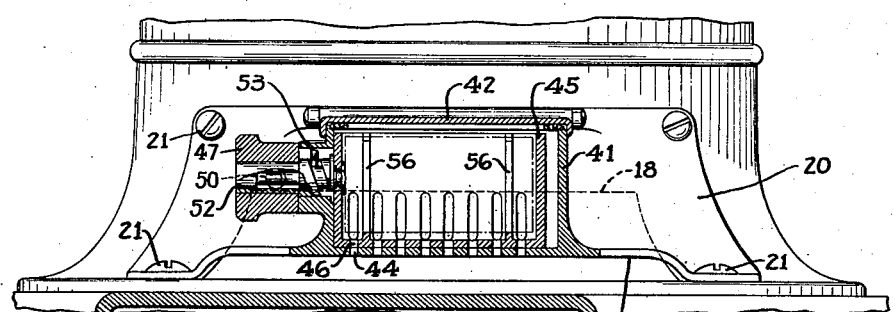
INVENTOR
Stanley R. Cummings
BY Harry S. Demarse
ATTORNEY Patented Sept. 20, 1938

2,130,484

UNITED STATES PATENT OFFICE 2,130,484

SUCTION CLEANER

Stanley R. Cummings, Canton, Ohio, assignor to The Hoover Company, North Canton, Ohio, a corporation of Ohio Application March 14, 1935, Serial No. 11,024

13 Claims. (Cl. 21—127)

The present invention relates to suction cleaners in general and particularly to new and novel improvements in odor-creating means in a suction cleaner. More specifically the invention comprises a suction cleaner in which motor-cooling air is used in the volatilization of a redolent material for the purpose of creating a pleasant odor to disguise the dry dust odor caused by the cleaner operation.

'In the modern suction cleaner foreign matter is removed from a surface covering undergoing cleaning and is conveyed therefrom by a moving stream of air. This air stream passes through a filter which removes the foreign matter permitting the air to pass to the atmosphere. The modern filter is extremely effective, but despite this effectiveness a small percentage of very fine material does escape into the atmosphere where it is noticeable to an operator with extremely sensitive olfactory senses. To render unnoticeable this characteristic odor of cleaner operation odorizer units have been incorporated into suction cleaner constructions. According to the present invention an improved odorizer construction is incorporated which makes use of motor-cooling air as the means of distribution of the products of volatilization of the volatile element included in the odorizer construction.

It is an object of the present invention to provide a new and improved suction cleaner. It is another object of the invention to provide a new and improved suction cleaner including an odorizer unit. Still another object is the provision of a suction cleaner in which a secondary air stream through the cleaner cools the motor and also performs the function of conveying into the atmosphere the products of volatilization produced by the odorizer unit in its operation. A still further object is the provision of an odorizer unit in a suction cleaner which is manually controlled and which makes use of motor-cooling air. These and other more specific objects will appear upon reading the following specifications and claims, and upon considering in connection therewith the attached drawings to which they relate:

Referring now to the drawings, in which the same reference character refers to like parts throughout:

Fig. 1 is a sectional view through a suction cleaner constructed in accordance with the present invention and showing the odorizer unit located at the rear of the motor;

Fig. 2 is a partial rear view of the motor and odorizer unit, being taken upon the line 2—2 of Fig. 1;

Fig. 3 is a horizontal section upon the line 3—3 of Fig. 2 through the motor and odorizer unit;

Fig. 4 is a section upon the line 4—4 of Fig. 3, showing the odorizer valve in the open position, the valve being shown in its closed position in dotted lines;

Fig. 5 is a section through the odorizer unit upon the line 5—5 of Fig. 3;

Fig. 6 is a section upon the line 6—6 of Fig. 3 showing the spring-and-cam arrangement for holding the valve in its open or closed positions;

Fig. 7 is a fragmentary plan view of a cleaner equipped with a modified form of the present invention;

Fig. 8 is a partial vertical section through the cleaner and modified odorizer unit being taken upon the line 8—8 of Fig. 7;

Fig. 9 is a transverse vertical section through the odorizer unit upon the line 9—9 of Fig. 8;

Fig. 10 is a section upon the line 10—10 of Fig. 8 illustrating the spring means for holding the unit in any adjusted position;

Fig. 11 is an enlarged section illustrating the sliding valve cam adjustment shown in Fig. 9;

Fig. 12 is a section through the valve cam adjustment upon the line 12—12 of Fig. 11;

Fig. 13 is a section upon the line 13—13 of Fig. 11;

Fig. 14 is a showing of the rotatable cam element;

Fig. 15 is an end view of the element shown in Fig. 14;

Fig. 16 is a view of the pin-actuated plunger included in the valve adjustment.

Referring now to Figures 1 to 6, inclusive, the first preferred embodiment of the present invention is illustrated. The invention is incorporated in a modern suction cleaner including a nozzle 1 which is connected to a fan chamber 2 by an air passageway 3. An exhaust outlet 4 from the fan chamber opens into a removable dust bag 5. A motor casing 6 is positioned immediately above fan chamber 2 and houses a motor comprising a stationary field 7 and a rotating armature 8. The motor shaft extends downwardly into the fan chamber 2 where it carries the suction-creating fan 10, which functions in the operation of the machine to draw cleaning air from the point of cleaning at the nozzle and to exhaust it into the dust bag. At the lower end of the shaft is formed a pulley 11. A power-transmitting belt 12 extends from the pulley through the air passageway 3 into the nozzle 1 where it engages a rotating agitator 13. The agitator is of a common and well-known type including beating elements and brushes and is adapted to cooperate with the moving air stream to effect the removal of foreign matter from the surface covering undergoing cleaning. As in the usual suction cleaner, wheels 14 are provided adjacent the nozzle and below the exhaust outlet 4 for the purpose of rendering the machine easily movable. An unshown handle makes it possible to propel the machine.

To maintain a desirable operating temperature in the motor, there is provided a motor ventilating fan 15 which is positioned immediately below the armature 8 and adjacent the plate or wall common to the motor casing and to the fan chamber and which is indicated by the reference character 16. Fan 15 is adapted to draw air through upper ports 17, formed in the motor casing, downwardly past the armature 8 and field 7, and to exhaust that air radially outward through ports 18, 18 formed in the motor casing 6. The stream of air in passing over the motor removes therefrom the heat generated in its operation.

In the usual cleaner construction a decorative housing is provided over the exhaust ports 18, 18 formed in the motor casing for the motor-cooling air. According to the present invention a housing 20 is provided adjacent the motor casing and the ports 18, 18 which is not only ornamental but has an additional function. Housing 20 is positioned at the rear of the motor casing 6 and lies in contact therewith, being removably secured by a plurality of screws 21, 21. An extended peripheral port 22 is formed by the rearward side of housing 20 above the exhaust outlet 4 which permits of the escape of the air which has been exhausted from the motor casing. Housing 20 is shown as a separate housing member from the casing proper, but it could well be made as an integral part of the casing without changing its function or use.

Housing 20 serves not only as a continuation of the motor casing, but also as the casing of an odorizer unit. A cylindrical internal seat 23 is formed within the housing and is adapted to receive and seat a removable vial 24 containing a volatile element. The inner end of seat 23 is provided with a central opening 25, on the inner side of which is positioned a peripheral seal 26 which the open mouth of vial 24 contacts. The outer end of seat 23 is at the side of housing 20 and is closed by a pivoted closure member 27 which is locked in closing position by a manually operable leaf spring latch 28. On its inner side closure 27 is provided with a spring-urged member 30 which contacts the outer end of the vial to hold that member against the seal 26.

At the end of seat 23 and adjacent opening 25 is provided a valve 31 pivoted upon a pin 32 and formed with a lever 33 which extends outwardly through the casing into a position where it can be operated by the user. Valve 31 is adapted to assume two positions. These two positions are indicated by the words "On" and "Off" found upon the housing 20 adjacent the lever 33, as illustrated in Figures 2 and 3. With the valve in the "on" position the valve is positioned as illustrated in Figure 4, and the opening 25 at the end of the vial 24 is exposed to the stream of air which passes through the housing 20 on its way from the motor to atmosphere. The valve is so shaped that in this "on" position it extends into the direct pathway of the air between the opening 18 and the exhaust outlet 22 and directs that air upwardly past the mouth of the vial and outwardly through louvers 34 formed in the top wall of the housing 20. The passage of the air by the open mouth of the volatile-element-containing vial results in the volatilization of that element and the creating of a pleasant odor in the surrounding atmosphere as the air mixes therewith.

With the valve moved to its "off" position, illustrated in Figure 3, the louvers 34 are closed by the valve and the opening 25 is sealed from the air passing through the housing. In this relationship practically no volatilization of the element within the vial 24 takes place.

The valve is held in either its "on" or "off" positions by means of a cam 35 carried upon the valve which is contacted by a spring 36 carried by the housing. In the movement of the valve from its "on" to its "off" position, or vice versa, the cam passes over center relative to the spring and thereafter the spring tends to hold the cam, and so the valve in the position in which it is located. A slight pressure upon the operating lever 33 is sufficient to overcome this holding force exerted by the spring.

To position a vial containing a fresh volatile element in the seat 23 it is only necessary for the operator to pivot outwardly the closure member 27, first having depressed the spring latch 28, and to remove the old vial replacing it by a new vial.

Referring now to Figures 7 to 16, inclusive, the second preferred embodiment of the invention is disclosed. According to this form of the invention the general arrangement of the cleaner is exactly the same as in the embodiment first described. The housing 20, in a modified form, is again positioned at the rear of the motor casing 6 and is provided with an exhaust port 22 through which air, which has passed from the motor opening, or openings, 18 escapes into atmosphere. According to the present embodiment of the invention housing 20 is shaped to accommodate a block 40 instead of the vial 24 which was incorporated in the previous embodiment. A rectangular container 41 is provided in housing 20, the top of which is normally closed by a pivoted cover plate 42 provided with a latch member 43. Container 41 is provided with spaced parallel slots 44, 44 in its forward wall and in its bottom wall which interiorly connects it with the air stream passing from the motor to the exterior atmosphere between the ports 18 and 22.

Within container 41, and slidable longitudinally thereof, is a valve element 45 which is open-topped and similar in shape to the container but of smaller size. Valve element 45 is provided with slots 46 of the same size and spacing as the slots 44, 44 in the container. With the valve box in its extreme left position, as illustrated in Figure 9, the slots of the container and of the valve element are alined and air from the motor is free to enter the interior of the valve. With the valve element moved to the right the slots are moved out of alignment and the interior of the valve is sealed from the motor cooling air. Leaf springs 49, 49 contacting the sides of the valve function to hold it in any set position.

At one end of the container 41 is positioned a manually operable adjusting mechanism for positioning the sliding valve member 45 within the container. This mechanism comprises a rotatable knurled knob 47 which is carried upon the outer end of the cam sleeve 48, shown in Figure 14. A set screw 50 secures the knurled member 47 and sleeve in fixed relationship. Cam sleeve 48 is rotatably mounted within a bearing seat 51 formed in the end of container 41 and is hollow for its entire length. Within sleeve 48 is positioned a sliding plunger element 52 provided with a radial pin 53 which extends outwardly through the cam way formed in the sleeve and into a slot 54 formed in the seat 51, which extends parallel to the plunger. The forward end of plunger 52 abuts the side wall of valve member 45, and is secured thereto by a bolt member 55.

To adjust the odorizer unit to its operative relationship the operator rotates the knurled member 47 until the word "On" formed thereon, as illustrated in Figure 7, appears opposite a pointer impressed upon the top of bearing seat 51. The rotation of the element 47 results in the rotation of the cam sleeve 48 in its bearing 51. As sleeve 48 rotates the pin 53 carried by a plunger 52 is moved axially of the plunger moving the plunger with it and also the valve element 45 which is attached thereto. When the word "On" appears opposite the indicator finger the slots 44 and 46 of the container 41 and of the valve element, respectively, are in alignment and the air passing from the motor to atmosphere passes through the container and the valve element, as illustrated in Figure 8. With the block 49 of volatile material positioned therein upon supporting ribs 56 which are provided to space the block from the apertures a slight distance, air will pass in and through the container and valve and into direct contact with the volatile element. To render the unit inoperative it is necessary only to rotate the knurled member 47 in the opposite direction from that aforedescribed resulting in the movement of the plunger 52 to the right, as illustrated in Figures 9 and 11.

I claim:

1. In a suction cleaner, suction-creating means including a fan and a driving motor, a motor-cooling fan driven by said motor and adapted to draw clean motor-cooling air only therewith, and an odorizer unit positioned in the pathway of the motor-cooling air only.

2. In a suction cleaner, a nozzle, a fan chamber connected to said nozzle, a suction-creating fan positioned in said chamber adapted to move dirt-laden air, a motor connected to said fan, a clean air pathway through said motor, a second fan driven by said motor adapted to move clean air through said motor, and an odorizer unit in the pathway of the air moved by said second fan only.

3. In a suction cleaner, a nozzle, a fan chamber connected to said nozzle, a suction-creating fan positioned in said chamber adapted to draw dirt-laden air from said nozzle, a motor casing adjacent said fan chamber, a motor in said casing connected to said fan, a motor-cooling fan positioned in said casing adapted to move clean air from the atmosphere therethru and past said motor, and an odorized unit in the pathway of the air thru said motor casing.

4. The construction recited by the preceding claim characterized in that the air thru said motor casing first passes over said motor to be warmed and then into contact with said odorizer unit.

5. In a suction cleaner, a nozzle, a fan chamber connected to said nozzle, a suction-creating fan positioned in said chamber, a motor casing adjacent said fan chamber, a motor in said casing connected to said fan, said casing being provided with ports above and below said motor, a motor-cooling fan in said casing arranged to draw air thereinto thru the upper port past said motor and to exhaust it thru said lower port, an odorizer unit housing adjacent said casing enclosing the lower port of said casing and formed with an exhaust port, and a body of odorizing material in said housing adapted to be contacted by air passing therethru.

6. In a suction cleaner, a nozzle, a fan chamber connected to said nozzle, a suction-creating fan positioned in said chamber, a motor casing adjacent said fan chamber, a motor in said casing connected to said fan, said casing being provided with openings above and below said motor, a motor-cooling fan in said casing arranged to draw air thereinto thru the upper opening past said motor and to exhaust it thru said lower opening, an odorizer unit housing adjacent said casing enclosing the lower opening of said casing and formed with an exhaust port, a body of volatile material in said housing adapted to be contacted by air passing therethru, and manually operable means to close said material to said air.

7. In a suction cleaner, a nozzle, a fan chamber connected to said nozzle, a suction-creating fan positioned in said chamber, a motor casing adjacent said fan chamber, a motor in said casing connected to said fan, said casing being provided with openings at opposite ends of said motor, a motor-cooling fan in said casing arranged to draw air thereinto thru one opening past said motor and to exhaust it thru an opening at the opposite end, an odorizer unit housing adjacent said casing enclosing the last-mentioned opening of said casing and formed with an exhaust port through which passes only air from the housing which is free of volatile material, a second exhaust port in said housing, a body of volatile material in said housing adapted to be contacted by air passing therethru and out thru said second exhaust port only, and a manually operable valve controlling the flow of air thrugh said exhaust ports and adapted to seal said volatile material or to expose said material to the air in said housing.

8. In a suction cleaner, a nozzle, a fan chamber connected to said nozzle, a suction-creating fan positioned in said chamber to draw dirt-laden air from said nozzle, a motor connected to said fan, a second smaller capacity fan driven by said motor to draw clean air only over said motor from the atmosphere, a volatile element container in the pathway of the air moved by said second fan, a slidable valve movable to seal said element from said air, and rotary means to control the position of said valve.

9. In a suction cleaner, a nozzle, a fan chamber connected to said nozzle, a suction-creating fan positioned in said chamber, a motor casing adjacent said fan chamber, a motor in said casing connected to said fan, said casing being provided with ports above and below said motor, a motor-cooling fan in said casing arranged to draw air thereinto thru the upper port past said motor and to exhaust it thru said lower port, an odorizer unit housing adjacent said casing enclosing the lower port of said casing and formed with an exhaust port, a volatile element container formed in said housing and including spaced intake and exhaust air ports, a slidable valve member in said container formed with ports adapted to mate with the ports of said container in certain of the positions of said valve, said valve member being adapted to receive a body of volatile material, and manually operable means to adjust said valve member.

10. In a suction cleaner, a nozzle, a fan chamber connected to said nozzle, a suction-creating fan positioned in said chamber, a motor casing adjacent said fan chamber, a motor in said casing connected to said fan, said casing being provided with ports at the opposite ends of said motor, a motor-cooling fan in said casing arranged to draw air thereinto through a first port past said motor and to exhaust it through a second port at the opposite end of said motor, an odorizer unit housing adjacent said casing enclosing the second port of said casing and formed itself with an exhaust port, and a body of odorizing material in said housing adapted to be contacted by air passing therethrough.

11. In a suction cleaner, a dirt-laden-air passageway, suction-creating means to move air through said passageway including a main fan and a driving motor, said motor including a stator, a rotor, and a casing, means to move clean cooling air from the atmosphere over said motor comprising a fan, an odorizer unit arranged to be contacted by air from said motor, and means to control the flow of air through said element.

12. In a suction cleaner, suction-creating means including a driving motor, a motor-cooling fan driven by said motor and adapted to draw motor-cooling air only thereover, an odorizer unit including a volatile-element-containing vial positioned in the pathway of the motor-cooling air only, and means to control manually the contact of air with the interior of said vial.

13. In a suction cleaner, suction-creating means including a driving motor, a motor-cooling fan driven by said motor and adapted to draw motor-cooling air only thereover, an odorizer unit including a container for a cake of volatile element positioned in the pathway of the motor-cooling air only, and means to control manually the passage of air through said container.

STANLEY R. CUMMINGS.